United States Patent [19]

Ortolano

[11] Patent Number: 5,146,679
[45] Date of Patent: Sep. 15, 1992

[54] METHOD OF CONVERTING GROUPED BLADING TO EQUIVALENT INTEGRAL COVERED BLADED

[76] Inventor: Ralph J. Ortolano, 3776 Coolheights Dr., Rancho Palos Verdes, Calif. 90274

[21] Appl. No.: 642,014
[22] Filed: Jan. 16, 1991
[51] Int. Cl.$^5$ .................. B21K 3/04; B23P 15/04; B23P 19/04
[52] U.S. Cl. .................. 29/889.7; 29/401.1; 29/402.07; 29/889.1
[58] Field of Search ............. 29/401.1, 402.07, 402.12, 29/402.13, 889.1, 889.22, 889.23, 889.7; 416/190, 191; 415/189, 190

[56] References Cited

U.S. PATENT DOCUMENTS

| 1,286,283 | 12/1918 | Gilson | 29/889.7 X |
|---|---|---|---|
| 1,554,614 | 9/1925 | Allen | 29/889.7 X |
| 4,155,152 | 5/1979 | Cretella et al. | 29/889.1 |
| 4,509,238 | 4/1985 | Lee et al. | 29/889.22 |
| 4,589,175 | 5/1986 | Arrigoni | 29/889.1 |
| 4,743,165 | 5/1988 | Ulrich | 29/889.2 X |
| 4,765,046 | 8/1988 | Partington et al. | 29/889.21 |
| 4,985,992 | 1/1991 | Vosgien | 29/889.7 |

FOREIGN PATENT DOCUMENTS 199180  6/1923  United Kingdom ............ 29/889.21

Primary Examiner—Joseph M. Gorski
Assistant Examiner—Peter Dungba Vo
Attorney, Agent, or Firm—Charles Berman

[57] ABSTRACT

An integral covered blading for a turbine is achieved by cutting a short arc cover spanning tips of multiple adjacent blades. Adjacent cover portions are formed for adjacent blades, each portion having facing sides. A material buildup between the facing sides of cover portions is effected and selective machining of the material buildup develops an interface between adjacent cover portions of adjacent blades. Short group blading is thereby converted to equivalent integral covered blading.

15 Claims, 3 Drawing Sheets

METHOD OF CONVERTING GROUPED BLADING TO EQUIVALENT INTEGRAL COVERED BLADED

BACKGROUND

Minimizing vibrations of turbine blading is important to minimize blade failure problems.

This invention relates to turbine blading. In particular, the invention is concerned with blading for steam turbines.

Blading for steam turbines have been constructed in many formats. Short grouped blading is provided where tips of neighboring blades are connected to form packets of approximately 3 to 12 blades in a group. To overcome vibration problems with such blading, techniques such as long-arc harmonic, double harmonic or continuous harmonic shrouding are developed from existing grouped bladings.

An alternative approach to avoiding vibration problems is the provision of an integral covered blading. In such a system, each blade is formed integrally at initial fabrication with its own cover. The blading is then located on the rotor of a turbine in its designed position. Blading assembled in this manner minimize lower and high frequency modes excited by the running speed of the rotor or a nozzle wake frequency.

In practice, turbines have a long life and blading currently in use in many turbines are of the grouped short arc design. When blade failure problems are encountered, it is necessary to replace the blading with some other design in order to return the turbine to service quickly. Such blade replacement is relatively expensive and results in wastage since many of the blades in the turbine are still in good condition.

It is an object of the present invention to provide a method and product for providing integral cover blades for a turbine which is different to the known integral cover blades and which can provide advantages over other blade cover techniques.

SUMMARY

By the present invention, a system is provided for furnishing an integral cover blade to blades which were constructed to have a cover of a non-integral nature.

According to the invention, there is provided a method of constructing integral covered blading for blades of a turbine wherein the blades have previously been constructed to be grouped with a selective number of neighboring blades in a rigid format.

By the present invention, adjacent blades are provided with a respective cover portion which is rigidly secured to the blade, the cover portion having been initially a separate portion to the blade. In the assembled position, the cover portion affixed to each respective blade is separated from an adjacent cover portion of adjacent blades.

In a preferred form of the invention, an existing arc cover spanning tips of multiple adjacent blades is cut at a position between adjacent blades to form a space between the arc cover portions associated with respective adjacent blades. This forms facing sides to adjacent cover portions associated with adjacent blades. The blades are separately removed from the rotor. A weld buildup is applied on at least one facing side of the cover portion on the adjacent blades. Thereafter, machining the weld buildup is effected to develop a contacting interface between adjacent arc cover portions of adjacent blades.

Effectively thereby an integral covered blading is obtained for the turbine blade.

The invention is now further described with reference to the accompanying drawings.

DRAWINGS

Figure 4A:
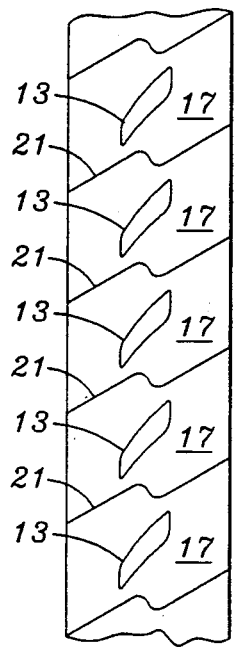
Figure 4B:
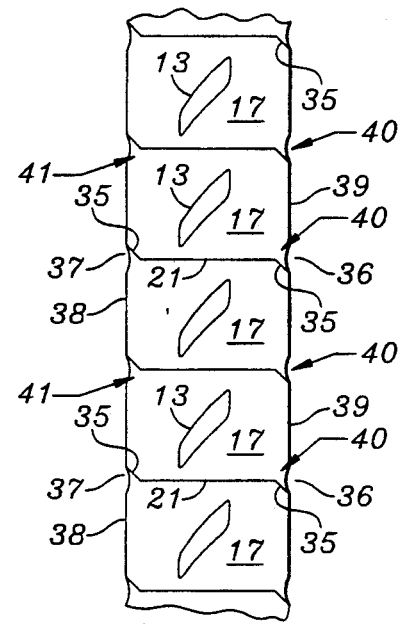
Figure 4C:
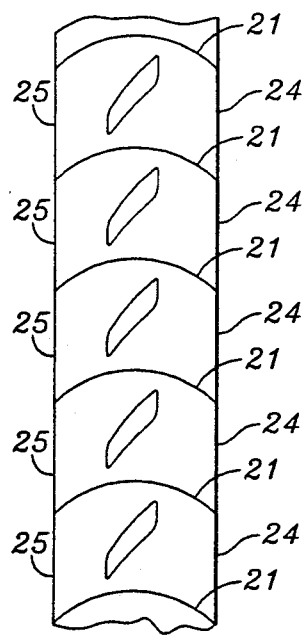
Figure 4D:
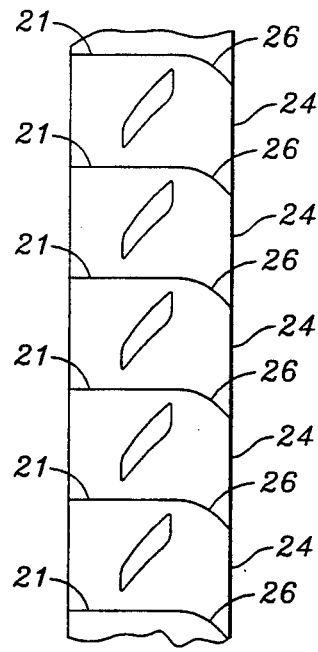
Figure 4E:
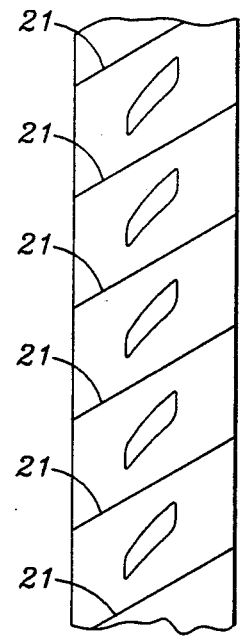

FIGS. 4a to 4e illustrate representative interfaces wherein FIG. 4a is a Z-cut shaped interface, FIG. 4b is a rectangular straight cut interface, FIG. 4c is a nested double wing interface, FIG. 4d is a single wing interface and FIG. 4e is a diagonal interface. In all the figures, the view of the blades is from the circumferential top view of a blade with the top of the cover portions being illustrated.

Figure 5:
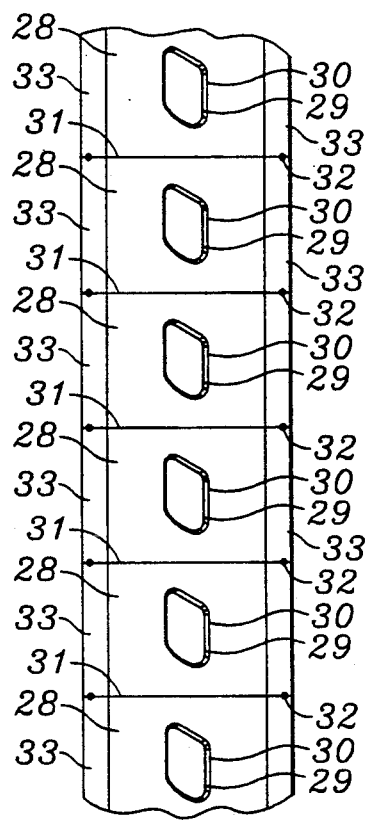

FIG. 5 is a top view of an integral cover for a blade turbine showing separate integral covers in location with extension portions tack welded together to initially secure the cover portions relative to each other.

Figure 6:
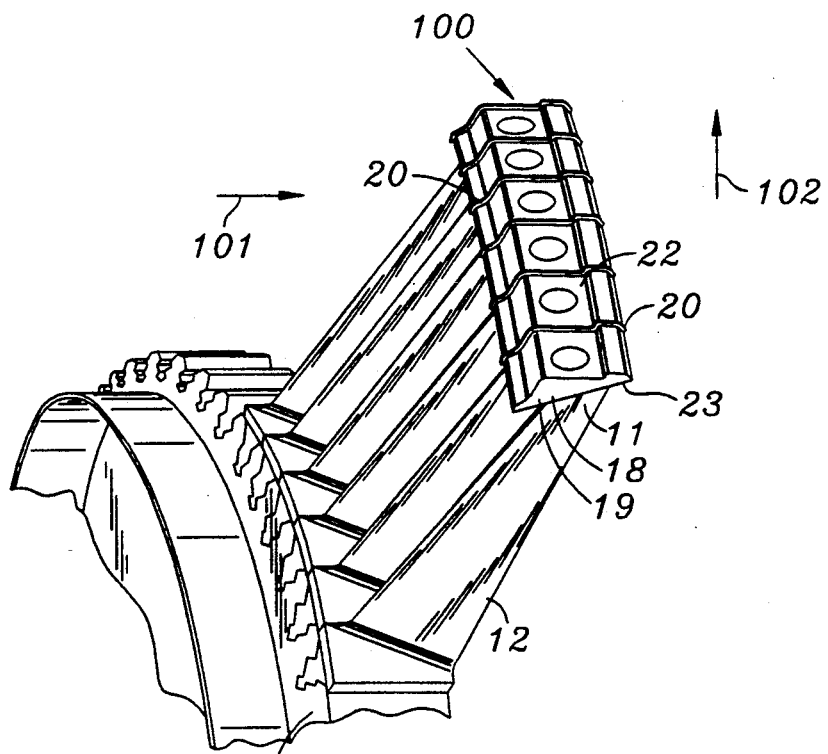

FIG. 6 is a perspective view illustrating a blades in position on a rotor with the weld buildup being effected along an adjacent facing side of each blade.

DESCRIPTION

A method of recycling existing short arc blading to form integral covered blading for turbine blades is achieved by cutting a short arc cover 10 spanning the tips 11 of adjacent blades 12. The short arc cover 10 illustrated in FIG. 1 spans six blades 12 and forms a group. A rivet 13 affixes the band 10 to each of the blades 12 and in this manner, the six blades of the short arm group are rigidly connected together. An adjacent band 14 is illustrated to the left side of the band 10 and an adjacent band or cover 15 is illustrated to the right hand side of the band 10. The short arc can extend between about 3 to about 12 blades.

The short arc cover 10 is cut by any suitable means between the tip locations of adjacent blades to form spaces 16 between the arc cover portions 17 formed from the arc cover 10. Between each adjacent cover portion 17, there is provided a facing side 18 associated with each adjacent blade 12. The blades 12 and associated cover portion 17 are then respectfully removed separately from a rotor 34.

Figure 3:
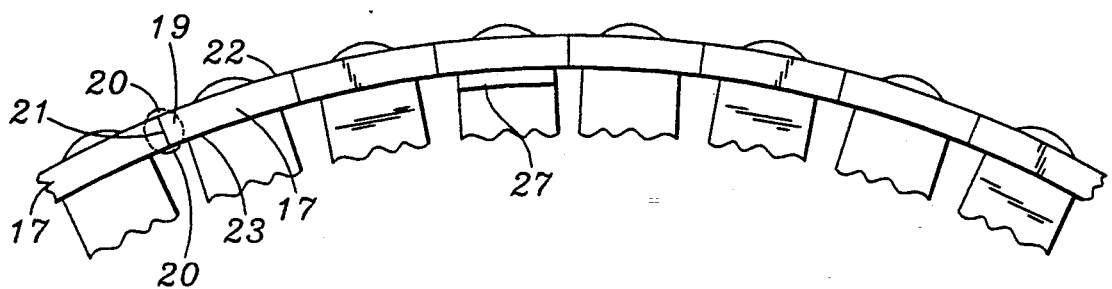
FIG. 3 is a side view of turbine blades illustrated in FIG. 2 after a weld buildup of cover portions and a machining to form a contacting interface between adjacent cover portions.

A material buildup in the form of a weld buildup or, alternatively, braze, plating, spraying or other mechanical means or metallurgical means is applied to each one of the facing sides 18 of the cover portions 17. The material buildup 19 is illustrated in FIG. 3. Machining is effected to remove excess material 20 from the buildup portion 19 and thereby provide a clean contacting interface 21 between adjacent arc cover portions 17. Portion 20 is on the outer circumferential face portion 22 of the band 17 and also on the inner circumferential face portion 23 of the band 17.

The interface 21 can have different interlocking shapes. In FIG. 4a, interface 21 is illustrated as a Z-cut.

In FIG. 4b, the interface 21 is a straight line rectangularly directed relative to the turbine blading and parallel to the rotor's rotational axis. In FIG. 4c, the interface 21 is a double wing or nested construction. This is a construction which has curves directed towards both the trailing edge 24 and leading edge 25 of a turbine blade. In FIG. 4d, a single wing design is illustrated such that the interface 21 has only a single curve 26 in the direction of the trailing edge 24. In FIG. 4e, the interface 21 is a diagonally directed line. The interface is of a nature such that a snug fit can be achieved between adjacent cover portions 17. In this manner, a contact at the interface line 21 between neighboring blades 12 occurs so that if any blade 12 attempts to vibrate, its motion is dampened by the neighboring blade 12. The example of FIG. 4b is likely the most effective structure since, as the blades try to twist due to centrifugal force, these rectangular shaped cover portions cause an increase in pitch as the cover portions rotate. This closes up clearances which develop between the cover portions due to centrifugal stretch of the blade and rotor during rotation. A blade foil 103 is shown in FIG. 4b.

Figure 1:
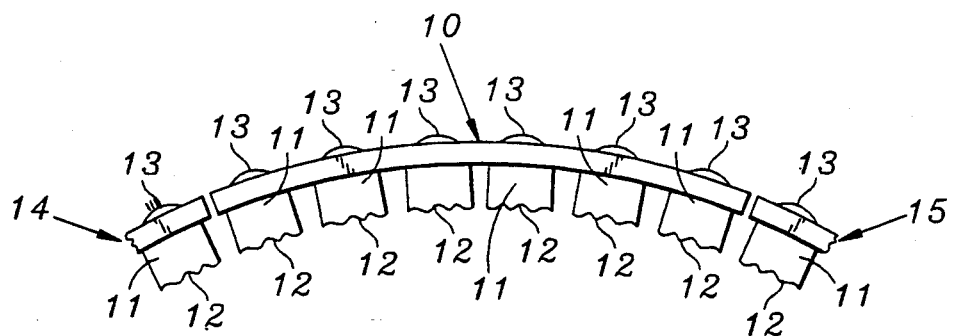
FIG. 1 is a side view representation of turbine blading illustrating the tips of the blade connected with a short arc group according to prior art techniques.
Figure 2:
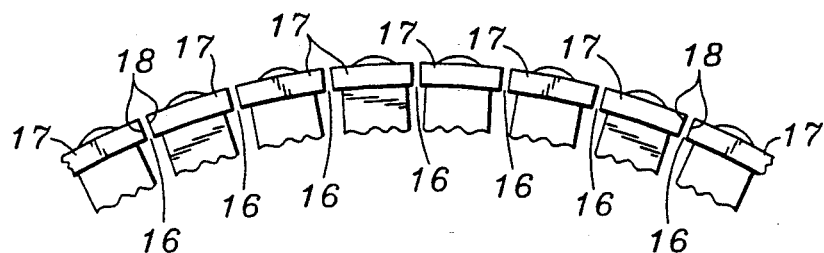
FIG. 2 illustrates a side view of the tips of blades of a short arc having been cut to define cover portions associated with each adjacent blade tip.

In most cases, the existing riveting 13 on blade 12 will be adequate to permit conversion of the blade 12 to the integral covered blading. This is because the bending stresses on the tenon on the blade 12 will drop when the rigid link of the band 10 as illustrated in FIG. 1 is cut so that the neighboring blades 12 have a relative freedom. In cases where the existing link is inadequate, the contact between the cover portions 17 and the blades 12 can be strengthened. This is by an underweld or underbraze 27 as illustrated in FIG. 3. A suitable stress relief on the underweld structures can be provided so that problems relating to corrosion do not develop.

Existing blading 12 can also be modified to integral covered blading by welding a section of cover portion 17 to a tip 11 of a blade 12. Techniques such as electron beam or laser welding can be used.

In the field, it is also possible to convert existing blading to integral covered blades in a manner which is more cost effective than removing existing blading. This is illustrated in FIG. 5. Conversion is accomplished by removing an existing cover 10 from the blades 12. The rivet 13 is restored as appropriate and riveting of new cover portions 28 as illustrated in FIG. 5 can be effected on the tenons 29. Each cover portion 28 has a tenon hole 30 and a suitable interface 31 is effected so that the cover portions 28 mate snugly with the neighboring blades. The cover portions 28 can be either of identical pitch, fitted to suit the pitch positioning of existing blading or altered to promote pretwist contact. The cover portions 28 can be attached by underbrazing or underwelding.

The use of existing blading 12 in the converted integral covered blading structure is superior in reliability and provides for improved efficiency. The individual cover portions 28 are assembled on blades 12 and then tack welded at 32 to allow the tenons 29 to be riveted without the cover portions 28 moving. After the riveting of tenons 29 to the cover portions 28 is effected, the excess extension material 33 which runs along the edges of each cover portion 28 is removed. In this manner, the tack weld sections 28 are trimmed off leaving integral cover portions 28 affixed to each blade 12.

In different embodiments of the invention, integral covered blading can be constructed initially in this manner. Thus, cover portions 28 can be affixed to the tips 11 of each blade 12 by suitable welding or brazing. Thereafter, each blade structure constitutes an equivalent integral covered blade.

In operation, the conversion of a short arc group is accomplished by cutting the existing bands 10 to result in, for instance, 124 pieces of shroud or cover portions 17 attached to 124 blades. The blades 12 are removed from the rotor 34. The cover portions 17 are weld built up and machined for tight fit with each other. Thereafter, the blades 12 are reassembled on the rotor 34. A small chamfer 35 is machined on respective diagonally opposite corners 36 and 37 of each cover portion 17. This is illustrated in FIG. 4b. The corners 36 and 37 alternate between the leading edge 38 and trailing edge 39 of the cover portions 17. At each corner 36 and 37, the adjacent corner 39 and 40 of the adjacent covers 17 respectively is rolled or staked into the chamfer 35 to lock adjacent cover portions 17 tightly together.

Cutting of the cover 10 using a cutoff wheel is done in a manner to minimize generation of heat thereby to minimize the disturbance and distortion of the cover 10 and the tenon material to be riveted at 13. Preferably, the cutting is effected under mechanical control rather than manually because of the precision nature of the work. A shrink can be effected to assure that blades 12 and cover portions 17 are not adversely affected. Also suitable blue marking is effected to scribe cut lines between adjacent blade tips. The line is preferably located so that a cut can provide at least 0.010 inches of extra material on the trailing side for accurate trimming. The cut off wheel thickness should be as thin as practical, about 0.045 inches thick. If any of the cover portions 17 are relatively loosely located on the blade tip 11, additional peening of the tenon 13 can be effected or further secured by underwelding 27. Tack welding 32 is applied if necessary while the further tenon peening is performed. The underwelding can be deposited on either or both the convex and concave side of the foil of blade 12.

In the initial operation, the scribe line to determine the cut position is formed in front of the leading edge of the blade foil 12 and parallel to the existing shroud gap between groups. A second set of scribe lines is scribed in front of the original scribe lines and spaced from that line. The cut is then made between the two lines. The weld buildup of the cover portion 17 is with sufficient material to permit a fully machined finish. When the blades are assembled on a rotor, the individual gaps between individual shroud segments should be such that a 0.0005 feeler gage should not fit between adjacent shroud cover portions 17 at any point.

In FIG. 6, the cut is illustrated so that the cut is effected at least substantially midway between the adjacent blades and a position providing an overhang in the leading side in the direction of rotation 102 of the blade. This is effected to offset the effect of the steam bending stress. The steam flow is indicated by arrow 101 and the leading side in the direction of rotation is indicated by numeral 100.

Many other forms of the invention exist, each differing from others in matters of detail. The invention has been described with reference to a preferred form of reconstructing covers for blades of a turbine. It should be appreciated that integral covered blading can be formed by applying cover portions 17 to the tips 11 of blades 12 in the manner described. Suitable additional material or filler material can be provided in a weld, braze or other mechanical or metallurgical buildup.

Machining can then be effected to provide a suitable contact interface between the adjacent cover portions.

The scope of the invention is to be determined solely in terms of the following claims.

I claim:

1. A method of constructing equivalent integral covered blading for a turbine having multiple blades supported by a rotor comprising:
   (a) cutting an arc cover spanning tips of multiple adjacent blades while supported by the rotor, the cut being between tip locations of said adjacent blades to form cover portions for each of said adjacent blade, thereby forming a space between the cover portions associated with respective adjacent blades, and thereby forming facing sides for adjacent cover portions of said adjacent blades;
   (b) removing separately each of said blades together with the cover portion associated with each of said blades from the rotor;
   (c) positioning said blades adjacent to each other and applying a material buildup on at least one facing side of the cover portions of said adjacent blades;
   (d) machining the material buildup thereby developing develop an interface between adjacent cover portions for each of said adjacent blade; and
   (e) replacing the blades in the rotor thereby forming equivalent integral covered blading.

2. The method as claimed in claim 1 wherein the arc cover spans between about 3 to about 12 blades in a group and wherein cutting is effected at least between substantially midway between adjacent blades and a position providing an overhang on the leading side in the direction of rotation.

3. The method as claimed in claim 1 wherein the material buildup is applied by a selectively mechanical or metallurgical action on both facing sides of the cover portions.

4. The method as claimed in claim 1 wherein the material buildup is applied between cover portions on all adjacent blades thereby to produce the effect of an integral cover.

5. The method as claimed in claim 1 including the applying selectively an underweld or underbraze between a cover portion and a blade tip thereby to effectively secure the cover portion to the blade.

6. The method as claimed in claim 1 wherein the material buildup extends beyond a circumferential outerface of the cover and a circumferential innerface of the cover, such extensions being subject to subsequent machining.

7. The method as claimed in claim 1 wherein the material buildup is applied between cover portions on all adjacent blades thereby to effect integral covered blading.

8. The method as claimed in claim 1 wherein the interface is selectively straight, curved, diagonal, Z-cut shape or interlocking form.

9. A method of constructing an integral covered blading for a turbine having an arc cover spanning tips of multiple adjacent blades comprising:
   (a) removing the arc cover from the tips of the blades;
   (b) restoring a rivet on the tip of each of said blades, such rivet being used for securing a cover portion to the tip of each of said blades; and
   (c) riveting a cover portion to the tip of each blade by utilizing the restored rivet whereby the blade has a cover portion rigidly associated with the blade such that the blade constitute part of equivalent integral covered blading.

10. The method as claimed in claim 9 including selectively underbrazing or underwelding the cover portion to the tip thereby to further secure the cover portion with the blade tip.

11. The method as claimed in claim 9 including repeating the restoration of rivet and riveting of respective cover portions with neighboring adjacent blades to develop an interface between adjacent cover portions of adjacent blades.

12. The method as claimed in claim 11 wherein the cover portions for each blade are separately secured prior to riveting the cover portions to the tips of the respective blades, thus separately securing the cover portions from moving during riveting.

13. The method as claimed in claim 12 wherein the separate securing is effected by tack welding together an extension material provided to each cover portion and wherein, after riveting, the extension material is removed, together with tack welded extension portions thereby leaving the cover portions secured to respective blades.

14. A method of converting a turbine blade grouping from a short arc grouping wherein neighboring blades are grouped together in packets of between about 3 to about 12 blades with short arc covers to a system of an integral covered blading comprising:
   (a) cutting the short arc covers spanning tips of multiple adjacent blades of each group so that each blade is provided with a cover portion associated with the tip of each of said blades;
   (b) providing a space between the cover portions associated with each respective adjacent blade and forming facing sides between each adjacent cover portion associated with each adjacent blade;
   (c) removing each blade from a rotor holding the blades;
   (d) positioning said blades adjacent to each other and applying material on at least one facing side of the cover portion of each of said adjacent blade;
   (e) machining the material from the cover portion thereby developing an interface between adjacent cover portions of each of said adjacent blade; and
   (f) replacing the blades in the rotor thereby forming equivalent integral covered blading.

15. The method as claimed in claim 14 wherein the interface is selectively straight, curved, diagonal, Z-cut shape or interlocking form.

* * * * *